United States Patent Office 2,711,392
Patented June 21, 1955

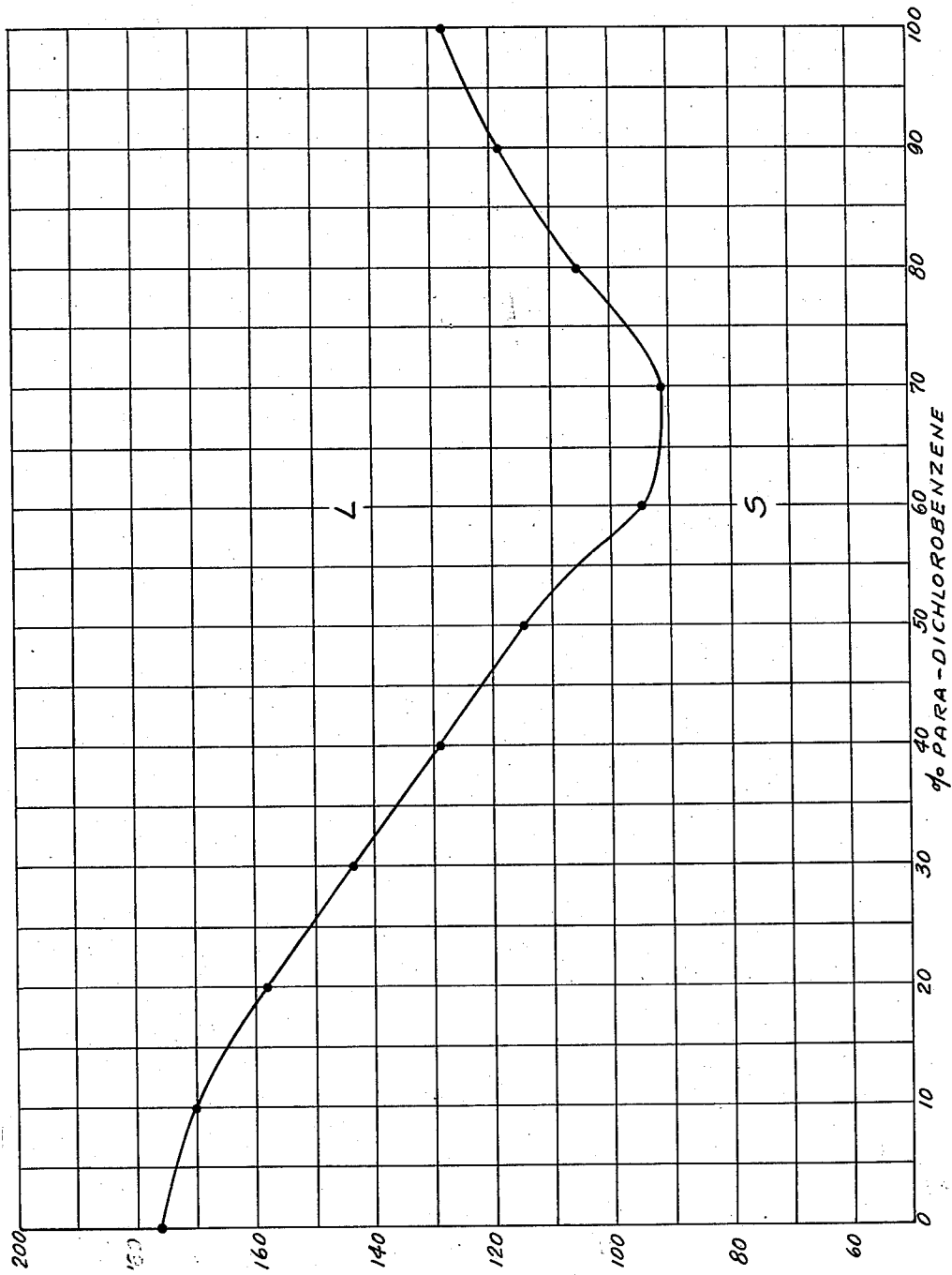

2,711,392

METHOD FOR RECOVERING THE OIL FROM OIL WELLS

George C. Irwin, University City, Mo., assignor of one-half to August W. Willert, Jr., Glendale, Mo.; Elise V. Irwin, administratrix of said George C. Irwin, deceased Application February 6, 1952, Serial No. 270,143

5 Claims. (Cl. 252—8.55)

This invention relates to improvements in the process for recovering oil from oil wells which have become depleted or impoverished in the oil content thereof. In particular, it relates to a process for dissolving paraffin in the oil bearing strata which impedes the passage of oil to the drill hole, decreasing the surface tension of the oil in the oil producing formation so as to facilitate the flow of oil.

In the past, it has been conventional in the United States to recover, for example, in certain localities, approximately 40% of the oil from the producing wells and then abandon the oil wells and then move on to a more productive region or strata. However, in the last few decades the productive fields that have been discovered have not been as large as the demand for oil in the various fields of chemical, industrial and domestic usages. Accordingly, it has become necessary as fewer productive fields are discovered and as the old oil wells are becoming depleted to look to some of the old abandoned oil wells for a secondary recovery of all the possible oil that is contained in the abandoned strata. It is further of obvious desirability to increase the productivity of present producing wells. New methods have been devised for recovering the oil content in these abandoned oil wells, as well as in existing wells, and these include such treatments as shooting the well with explosives, acidizing, gas repressuring and water flooding of the strata. In the acidizing treatment, acids such as hydrochloric acid, or other mineral acids of like nature, are used to dissolve limestone in the oil bearing strata itself and facilitate the flow of oil to the oil well drill string. Limestone in the oil bearing strata had been a problem prior to the discovery of this acidizing treatment and effectively prevented passage of oil, which was intimately associated with the limestone, to the area of decreased pressure surrounding the oil well itself. The acidizing treatment was one means for increasing the oil bearing production in the oil well from the surrounding strata, and by this means, as much as an additional 25% of the oil in the strata could be reclaimed.

Another factor which has prevented free passage of the oil in the productive strata to the oil well has been the presence, so-called, of paraffin residues in the oil itself which blocks pores and interstices in the strata, and this solid paraffin has effectively impeded flow of the residue of the oil in the strata to the drill hole. This so-called paraffin is usually composed of oil, water, water-and-oil emulsions, sand and scale all bound together by oil residues such as paraffin or asphalt. These paraffin residues have a tendency to solidify at cool temperatures, and in the past the refrigeration effect caused by suddenly decreasing the pressure in the oil bearing formation has caused solid paraffin to clog the passageways in the formation until equilibrium conditions were reestablished by the passage of time.

One of the means proposed to widen the pores and fissures in the oil bearing formation, by means of which viscous paraffin containing oils can be made to flow to the bore hole, has been the method of the hydrafrac process. In this process a viscous gel is introduced under pressure into the formation to expand the pores and fissures and is then removed by the use of a breaker solution which decreases the viscosity of the gel and permits a free flow. This method is rather complicated and entails several different operations and thereby ties up the bore holes' time with consequent disadvantages both of manpower and time. This tie-up of the bore hole comes about due to the fact that the well is not producing oil during this period due to the operations being performed upon it.

Another method suggested in the past for overcoming this problem has been the introduction of kerosene, gasoline or naphtha which act as a solvent for the paraffin to clear the interstitial pores and crevices in the formation and allow the free passage of oil from the strata to the oil well. However, in the operation of this process, it has been found to be extremely difficult without the use of auxiliary complicated and expensive equipment to introduce the kerosene or liquid solvent in the bottom of the well, and it has been found desirable to use some type of a solvent for the paraffin which can be introduced in solid form at the surface level and which will become a liquid having a low surface tension at the bottom of the well. This presents a further problem because the temperature at the bottom of the well varies over a wide range, depending upon the location of the well and the depth of the well. It has also been suggested to use naphthalene, which is a solid at the usual temperatures in the bore hole and will dissolve in oil, but an inherent disadvantage of this process devolved from the lack of control of the melting of the naphthalene.

By means of this invention, it has been found possible to use a solvent for the paraffin which exists in solid form at the temperature prevailing at the surface of the well but may be so controlled that it can be made to dissolve at the bottom of the well where the temperature is higher and thereby serve as an excellent solvent for the paraffin in the surrounding strata and facilitate the production and recovery of oil from heretofore relatively inaccessible areas and crevices. It has further been found possible to obtain better distribution of this novel solid solvent since, by virtue of its melting at the bottom of the bore hole, better distribution can be effected through the casing perforations at the bottom of the well.

Accordingly, it is an object of this invention to provide means for simply and efficiently dissolving paraffin in the oil bearing strata surrounding an oil well.

It is a further object of this invention to provide a solvent for paraffin which will be in solid form at the temperatures ordinarily encountered at the surface of the well and yet dissolve at the bottom of the oil well when introduced into the drill hole, where increased temperatures are encountered.

Another object of this invention is to provide a solvent for paraffin which can be easily compounded and regulated to give a good and efficient control over the melting properties of the solvent.

I have found it possible according to my invention to mix naphthalene and another organic solvent for paraffin and form a melting point mixture which is lower than either one of the melting points of the respective compounds, and as a consequence, will have a lower surface tension in the oil bearing formation at the bottom of the bore hole, and whereby increased penetration of the formation can be effected. Further, by virtue of the decreased surface tension, the passage of the oil itself is facilitated in the pumping operation. The eutectic mixture, so formed, can be regulated, according to the composition, to have a melting point ranging anywhere from that of naphthalene, which melts at 176° F., or the melting point of the organic solvent, to the lower melting point of the eutectic mixture which appears between a composition of pure naphthalene and a composition of the other pure organic solvent.

The accompanying drawing shows the melting point properties of such a mixture for the system naphthalene and 1,4 dichlorobenzene, commonly called paradichlorobenzene, the latter of which has a melting point of approximately 128° F.

This drawing clearly shows that, as the percentage of paradichlorobenzene is increased and the percentage of naphthalene is decreased, the melting point falls from an original high of approximately 180° F. at zero percent paradichlorobenzene corresponding to 100% naphthalene, down to a melting point of 129° F. at 40% paradichlorobenzene. As the concentration of paradichlorobenzene is increased from 40%, the melting point of the mixture decreases to approximately 91° F. for the range corresponding to approximately 63% to 70% paradichlorobenzene. As the concentration of paradichlorobenzene is increased in this mixture, the melting point rises in a more or less straight line relationship until 100% of the paradichlorobenzene is obtained at which the melting point is, of course, 128° F. It is evident from an inspection of this table that mixtures may be compounded which will be solid at any prevailing temperature at the surface of the well and yet will melt in the drill or bore hole of the well at the increased temperatures prevailing in that neighborhood. This is especially desirable because it is very important for simple and efficient operation to introduce the solvent in solid form at the surface of the oil well, and drop the solid compounded mixture into the casing or the tubing of the well and let it drop to the bottom by virture of its own weight or aided by any auxiliary pumping means which may be available.

However, at the bottom of the bore hole where the increased temperatures are encountered, and which, of course, may be determined by conventional means, the solvent melts and liquidizes and dissolves the paraffin in the surrounding strata oil producing formations.

As an example of the range of temperatures encountered, the temperature at the surface of the oil well may be in the neighborhood of 90° F., and under such a condition it may be found desirable to use the 60% concentration paradichlorobenzene. In this situation, a mixture of naphthalene and paradichlorobenzene would not melt until a temperature of 95° F. had been obtained. Accordingly, this concentration of the mixture could easily be introduced into the oil well where it would dissolve at the bottom at the higher temperature prevailing therein. It is to be noted that even if the temperature at the bottom of the well were quite a bit higher, say in the neighborhood of 110° F., there would be no apprecaible melting of the solvent in the upper regions of the bore hole because of the short time factor involved in conducting the solvent to the bottom of the bore hole. As a rough rule of thumb, it is possible to estimate the approximate temperature at any level of the bore hole where the distance below the surface is known. For example, at approximately 50 ft. levels, the temperature rises 1° F. above a base temperature of 60° F., so if the well is 1500 ft. in depth the temperature at the bottom of the bore hole will be approximately 90° F., according to one system for estimating the temperature at varying levels of the earth. Accordingly, once the temperature at the bottom of the bore hole is known, an appropriate concentration of the naphthalene and paradichlorobenzene mixture may be used which will be solid at the surface of the well under prevailing weather conditions and will melt once the solvent comes in contact with the increased temperature to be found down in the bore hole. For instance, if the surface temperature is in the range or neighborhood of 110° F., which may be encountered in such oil producing areas as Texas, Iran, Venezuela, and Arabia, it can be seen from an inspection of the table that the concentrations of paradichlorobenzene can be used anywhere in the range of 0% to approximately 50% or in the range 85% to 100% paradichlorobenzene.

The solvent comprised of naphthalene and paradichlorobenzene particularly disclosed in this invention is not only capable of very exact regulation and control with respect to the melting properties, but it is also of increased solvent capacity for the paraffin itself.

As an example, using a mixture of naphthalene and kerosene as a solvent for the naphthalene, it has been determined that in such a mixture, where naphthalene is present in a concentration of 60%, the kerosene 40% by weight, the solubility of paraffin at 103° F., is 116%. I have found that it is possible to dissolve 173% of paraffin at 103° F. using a mixture of 60% paradichlorobenzene and 40% naphthalene. By using 60% of the latter mixture of 60% paradichlorobenzene and 40% naphthalene with 40% kerosene, 169% of paraffin was dissolved at this temperature. The use of the paradichlorobenzene and naphthalene mixture represents an increase of 57% in the solvent capacity of my new and novel solvent over naphthalene and kerosene and an increase of 4% when diluted with kerosene.

Other organic compounds may be used with naphthalene to form eutectic melting point mixtures such as: 1-chloro - 4 - iodo - benzene, 1,2 - iodo - benzene (ortho-diiodo - benzene), 1,3 - diiodo - benzene (meta - diiodo-benzene), 1,2,3,4 - tetra - chloro - benzene, 1,2,3,5 - tetra-chloro - benzene, 1,2,4 - tribromo - benzene (as - tri-bromo - benzene), 1,2,3 - trichloro - benzene (v - tri-chloro - benzene), 1,2,4 - trichloro - benzene (as - tri-chloro - benzene), 1,3,5 - trichloro - benzene (sym - tri-chloro-benzene) and their homologs. These function in a similar manner to paradichlorobenzene described above. Likewise, compounds which are not solvents for paraffin may be used with naphthalene to form a eutectic melting point mixture so that an efficient melting point control may be had in which the solvent action is primarily due to the naphthalene. It is desirable that all these compounds have a melting point, however, above that of the normal temperature at the well and below that of naphthalene.

In the actual operation of the process according to my invention, I may compound the solvent comprising a mixture of naphthalene and paradichlorobenzene in a premixed relationship such as by pelleting, briquetting, granulating, etc., or I may add the two compounds together in the bore hole at a point on the surface or cause the two compounds to be brought together at the bottom of the well so that an intimate mixture is obtained when the two are conducted to the bottom of the bore hole. As has been mentioned before, it is eminently desirable and necessary that the solvent be in solid form at the surface and when it is being conducted down the bore hole to the oil bearing strata region so that there is little intermingling with any liquid which may be present in the bore hole which would impede passage of the liquid solvent. It has further been found desirable to cause the solid solvent to be compressed into a dense form in order that any solvent action of the oil itself is minimized. The solid solvent which may be pelleted or briquetted or prepared in any other conventional solid form is much more easily introduced into the bottom of the bore hole as a consequence of this treatment than would be the case if it were introduced in liquid form.

Furthermore, my process may be carried out separately or simultaneously with other operations, such as the acidizing treatment mentioned previously, because the solvent is inert to the chemical agents commonly encountered in the oil well. Both naphthalene and paradichlorobenzene do not react with the conventional acids used in the acidizing treatment or the various drilling muds and cements which may be used at various stages in the operation of the oil well. Recovery of the components of my solvent may be effected from the oil after it leaves the well in conventional manner by steam stripping, rectification and other known means.

By the invention of my new and useful solvent I have made it possible to regulate and control the melting point characteristics so that the solvent can be used under any condition that may exist at the surface of the oil well or at the bottom of the bore hole. This is of tremendous advantage because of the wide range of ambient conditions encountered both above and below the surface of the oil well which requires a solvent having a very wide range of control with respect to melting point characteristics. My process is applicable, in general, although it has been specifically described with respect to the paradihalogenobenzene compounds, to any organic solvent for paraffin which has a melting point above the normal operating temperature at the well and is used in admixture with naphthalene. Such mixtures of naphthalene and the organic compounds of the class described will form eutectic mixtures having a melting point lower than the melting point of either one of its components, and it can be seen thereby that such a mixture is of an inherently regulatable and controllable quality and can be used according to the exigencies of the situation depending upon the temperatures at the bottom of the bore hole and at the surface of the well. For example, if desirable under some circumstances, it may be possible to use two compounds which are known solvents for paraffin and both of which exist in solid form below 100° F. but have melting points that are separated by a range of, in the neighborhood, 30° F. Mixtures of such compatible organic solvents for paraffin will form eutectic mixtures which have a melting point below the melting point of either one of the components and it is possible according to the process of this invention to use such concentrations which will fall within the desired range of applicability in the oil well recovery process. It is further to be noted that even if my solid solvent composition does not dissolve at the bottom of the bore hole due to unforeseen or ambient temperature conditions at the bottom, there will be a sublimation with the lower melting constituent coming off first and then the naphthalene, and these two vapors will tend to dissolve out the paraffin residues.

While I have described my invention with respect to use of naphthalene with dihalogenobenzene, it will be apparent, as pointed out above, that other solvents can be used which have a melting point within the required range and form eutectic mixtures. Accordingly, the invention is not limited to the dihalogenobenzenes but is susceptible to various changes and modifications with respect to the solvent without departing from the spirit of the invention, and I desire therefore that only such limitations shall be considered as are specifically set forth in the attending claims.

What is claimed is:

1. A process for dissolving paraffin which impedes the free flow of oil in an oil bearing formation surrounding an oil well which comprises adding to the bore hole a solvent mixture of organic compounds which have a melting point above the surface temperature at the oil well and which will form a eutectic mixture having a melting point below that of at least one of the compounds, dissolving the paraffin in the solvent mixture and thereby removing obstructions in the strata caused by the paraffin so that the oil can flow freely through the strata.

2. A process for dissolving paraffin at ambient temperatures above atmospheric temperature which blocks the free flow of oil in an oil bearing formation surrounding an oil well and reducing the surface tension of the oil in said formation which comprises adding to the bore hole a mixture of organic solvents which have individual melting points above the temperature at the surface of the well, said mixture having a eutectic melting point below the melting point of any one of the individual solvents, said mixture being added at the surface of the well in solid form but having a melting point below the temperature prevailing in the bottom of the bore hole, dissolving the paraffin in the solvent mixture and thereby removing the paraffin obstructions in the oil bearing strata to permit the free flow of oil through the strata.

3. A process for dissolving paraffin at ambient temperatures above atmospheric temperature which blocks the free flow of oil in an oil bearing formation surrounding an oil well and reducing the surface tension of the oil in said formation which comprises adding to the top portion of the bore hole a mixture of an organic solvent comprising naphthalene and an organic solvent for paraffin which forms a eutectic mixture having a melting point below that of said ambient temperature and of either of its components, said mixture having a melting point above that of the atmospheric temperature, dissolving the paraffin in the solvent mixture and thereby removing obstructions in the strata caused by the paraffin so that the oil can flow freely.

4. The process of claim 3 in which the organic solvent is a member of the group consisting of orthodiiodobenzene, paradichlorobenzene and metadiiodobenzene.

5. The process of claim 3 in which the organic solvent is paradichlorobenzene.

References Cited in the file of this patent
UNITED STATES PATENTS

| | | |
|---|---|---|
| 1,097,406 | Erlenbach | May 19, 1914 |
| 1,754,296 | Ackerman | Apr. 15, 1930 |
| 1,861,177 | De Groote | May 31, 1932 |
| 2,139,595 | Lerch et al. | Dec. 6, 1938 |
| 2,411,044 | Landrum et al. | Nov. 12, 1946 |